(12) United States Patent
Brown et al.

(10) Patent No.: US 10,824,364 B2
(45) Date of Patent: *Nov. 3, 2020

(54) POINT-IN-TIME SNAP COPY ON ASYNCHRONOUS CONSISTENCY GROUP MANAGEMENT

(71) Applicant: INTERNATIONAL BUSINESS MACHINES CORPORATION, Armonk, NY (US)

(72) Inventors: Theresa M. Brown, Tucson, AZ (US); Anthony J. Ciaravella, Tucson, AZ (US); Nicolas M. Clayton, Warrington (GB); Michael S. Gagner, Tucson, AZ (US); Theodore T. Harris, Jr., Tucson, AZ (US); Mark L. Lipets, Tucson, AZ (US); Gregory E. McBride, Vail, AZ (US); Carol S. Mellgren, Tucson, AZ (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,623

(22) Filed: Jul. 12, 2019

(65) Prior Publication Data
US 2019/0339874 A1 Nov. 7, 2019

Related U.S. Application Data

(63) Continuation of application No. 15/476,269, filed on Mar. 31, 2017, now Pat. No. 10,416,921.

(51) Int. Cl.
*G06F 12/00* (2006.01)
*G06F 3/06* (2006.01)
(Continued)

(52) U.S. Cl.
CPC .............. *G06F 3/065* (2013.01); *G06F 3/061* (2013.01); *G06F 3/067* (2013.01); *G06F 3/0646* (2013.01);
(Continued)

(58) Field of Classification Search
CPC ........ G06F 3/065; G06F 3/0619; G06F 3/067; G06F 3/0646; G06F 3/0647; G06F 11/1446; G06F 11/1458
See application file for complete search history.

(56) References Cited

U.S. PATENT DOCUMENTS 7,203,732 B2 4/2007 McCabe et al.
7,571,293 B1 8/2009 LeCrone et al.
(Continued)

OTHER PUBLICATIONS

"I/O Priority Management for Copy Services Relationships", IP.com, IP.com No. IPCOM000198983D, Aug. 19, 2010, pp. 5.
(Continued)

*Primary Examiner* — Shawn X Gu
(74) *Attorney, Agent, or Firm* — William K. Konrad; Konrad Raynes Davda & Victor LLP

(57) ABSTRACT

In one embodiment, a local copy target is also a local primary of an incomplete consistency group of an ongoing asynchronous mirror relationship. Completion of the consistency group is facilitated notwithstanding that the local copy operation was initiated after the consistency group was initiated. In one aspect, asynchronous data mirroring logic, prior to the overwriting of existing data of the target, reads the existing data of the target for purposes of mirroring the read data to a remote secondary target of the consistency group. As a result, existing data of the local copy target which is also a local primary source of the consistency group, may be safely overwritten. Other features and aspects may be realized, depending upon the particular application.

18 Claims, 10 Drawing Sheets

(51) Int. Cl.
  *G06F 11/14* (2006.01)
  *G06F 11/20* (2006.01)
(52) U.S. Cl.
  CPC ........ *G06F 3/0647* (2013.01); *G06F 11/1402* (2013.01); *G06F 11/1446* (2013.01); *G06F 11/1458* (2013.01); *G06F 11/2064* (2013.01); *G06F 11/2074* (2013.01); *G06F 3/0619* (2013.01)

(56) References Cited

U.S. PATENT DOCUMENTS

| | | |
|---|---|---|
| 9,378,219 B1 | 6/2016 | Bono et al. |
| 2008/0294859 A1 | 11/2008 | Nguyen |
| 2009/0313428 A1 | 12/2009 | De Jong |
| 2015/0286433 A1* | 10/2015 | Dain ............... G06F 3/0655 711/103 |
| 2018/0157421 A1 | 6/2018 | Brown et al. |
| 2018/0284988 A1 | 10/2018 | Brown et al. |

OTHER PUBLICATIONS

"Maintaining Consistency Groups with Space Efficient Volumes", IP.com, IP.com No. IPCOM000211741D, Oct. 14, 2011, pp. 5.
U.S. Appl. No. 15/476,269, filed Mar. 31, 2017.
Office Action dated Jul. 19, 2018, pp. 15, for U.S. Appl. No. 15/476,269.
Response dated Oct. 19, 2019, pp. 13, to Office Action dated Jul. 19, 2018, pp. 15, for U.S. Appl. No. 15/476,269.
Final Office Action dated Jan. 29, 2019, pp. 11, for U.S. Appl. No. 15/476,269.
AFCP and Response dated Apr. 1, 2019, pp. 14, to Final Office Action dated Jan. 29, 2019, pp. 11, for U.S. Appl. No. 15/476,269.
Notice of Allowance dated May 1, 2019, pp. 7, for U.S. Appl. No. 15/476,269.
List of IBM Patents and Applications Treated as Related, Jul. 12, 2019, pp. 2.

\* cited by examiner

POINT-IN-TIME SNAP COPY ON ASYNCHRONOUS CONSISTENCY GROUP MANAGEMENT

BACKGROUND OF THE INVENTION

1. Field of the Invention

The present invention relates to a computer program product, system, and method for point-in-time snap copy on asynchronous consistency group management.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Thus, data from a host to be stored in the data storage system is typically directed to a primary system at a local site and then replicated to secondary system which may be geographically remote system from the primary system.

The process of replicating, that is, copying data over to the secondary system can be setup in either a synchronous or asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed. As a result, data storage to a primary storage system and a secondary system in a synchronous relationship may adversely affect system performance of the host while the host awaits completion of the synchronous copy operations. In storage systems in which the primary and secondary systems are widely separated, delays to completion of the synchronous copy operations may be greater, which can further adversely affect host performance. For example, in storage systems in which the primary system and the secondary system are separated by a geographical distance of 300 kilometers (Km) or more, for example, there can be a delay of 3-5 seconds (or more) before the data is successfully replicated at the secondary system.

As a result, storage systems frequently employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a volume may be generated using a point-in-time snap copy function such as the IBM® FlashCopy function, for example. The point-in-time snap copy function creates a "snapshot" of the contents of a source volume as of a particular point-in-time in a target volume which may be referred to as the point-in-time snap copy volume. One version of a point-in-time snap copy function transfers the contents of the source volume to the point-in-time snap copy volume in a background copy operation.

A local copy target bitmap having a bit for each track of the point-in-time snap copy volume, is used to indicate tracks which have not yet been transferred to the point-in-time snap copy volume. As the contents of each track of the source volume is copied to the target volume, the corresponding bit of the local copy target bitmap is updated (typically reset) to indicate successful transfer of the contents for the associated track. Any read operations directed to a track of the point-in-time snap copy volume which has not yet received the contents of the corresponding track of the source volume, are redirected to obtain the contents of that track from the source volume. Accordingly, the contents of a point-in-time snap copy volume are immediately available albeit indirectly, before any tracks have actually been transferred to the target volume. Conversely, if the host directs an update to a track of the source volume before the contents of that track have been transferred to the point-in-time snap copy volume, the contents of the track of the source volume are transferred to the point-in-time snap copy volume before the update is permitted to overwrite the contents of that track of the source volume.

Another version of a point-in-time snap copy function omits the background copy operation. Thus, the contents of the source volume are not transferred to the point-in-time snap copy volume in a background copy operation but are transferred in response to an update of the source volume. Accordingly, any read operations directed to a track of the point-in-time snap copy volume are usually redirected to obtain the contents of that track from the source volume. However, if the host directs an update to a track of the source volume, the contents of the track of the source volume are transferred to the point-in-time snap copy volume before the update is permitted to overwrite the contents of that track of the source volume.

In a synchronous data replication system, a point-in-time snap copy volume may be made of a primary volume at the primary system with respect to the contents of the primary volume as of a particular point-in-time, and a point-in-time snap copy volume may be made of a secondary volume at the secondary system with respect to the contents of the secondary volume as of the same point-in-time. Because the primary and secondary volumes are synchronized, the respective point-in-time snap copy volumes will also be synchronized and therefore consistent with each other notwithstanding that the point-in-time snap copy volumes are made in different places, that is, the primary system and the secondary system.

In an asynchronous data replication system, a point-in-time snap copy volume may also be made of a primary volume at the primary system with respect to the contents of the primary volume as of a particular point-in-time. Similarly, a point-in-time snap copy volume may be made of a secondary volume at the secondary system with respect to the contents of the secondary volume as of a particular point-in-time. However, because the primary and secondary volumes are not synchronized, the respective point-in-time snap copy volumes will also not be synchronized and therefore will not be consistent with each other. Hence, to provide a backup copy of a point-in-time snap copy volume of a primary volume at the primary system, the point-in-time snap copy volume generated at the primary system is typically transferred over a network to the secondary system.

To maintain a degree of consistency of data across multiple volumes at a secondary system, the IBM® TotalStorage disk subsystem Peer-to-Peer Remote Copy (PPRC) function supports the concept of a PPRC consistency group. Volumes in a PPRC relationship that are configured into a PPRC Consistency Group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

One of the volumes of the primary system which may be in a consistency group with volumes at the secondary system, may itself be a target of a point-in-time snap copy as long as the point-in-time snap copy relationship is initiated prior to formation of the consistency group which includes the target volume of the point-in-time snap copy. Previously establishing a point-in-time snap copy relationship having a target volume which is already one of the volumes of the primary system in a consistency group with volumes at the secondary system, is not supported.

SUMMARY

One general aspect of copy on consistency group management in accordance with the present description includes initiating a consistency group using asynchronous local to remote mirroring of data from a first local primary source to a first remote secondary target, and after initiating the consistency group, initiating local to local copying, from a local copy source, such as a second local primary source, for example, to the first local primary source of the consistency group, as a local copy target of the local copy source. In one embodiment, the local to local copying includes creating a point-in-time snap copy of the local copy source, operating as a snap copy source, to the first local primary source of the consistency group, operating as a snap copy target of the snap copy source. The local copying includes overwriting tracks of the local copy target (which is also the first local primary source of the consistency group) with existing data from corresponding tracks of the local copy source when tracks of the local copy source are updated by a host, for example.

Prior to overwriting the existing data of the first local primary source of the consistency group with existing data of the local copy source, the existing data to be overwritten is first read from the first local primary source for subsequent mirroring to a first remote secondary target of the consistency group. After the existing data is read for subsequent mirroring, that existing data of the first local primary source of the consistency group may be safely overwritten with the existing data transferred from the local copy source in connection with an update of existing data of the local copy source.

In another aspect, the local to local copying includes copying the existing data read from the first local primary source prior to be overwritten, to a local primary side file. The existing data is subsequently mirrored from the primary side file to the first remote secondary target.

In one embodiment, initiating local to local copying from the local copy source to the first local primary source of the consistency group, as a local copy target of the local copy source, includes providing a local copy target bitmap data structure associated with the first local primary source which is a local copy target of the local copy source. For example, a set bit of the local copy target bitmap data structure associated with a track of the first local primary source of the consistency group indicates that the track of the first local primary source retains the original (existing) data such that the original (existing) data of the corresponding track of the local copy source remains to be copied by the local to local copying to the corresponding track of the first local primary source of the consistency group. Conversely, in this example, a reset bit of the local copy target bitmap data structure associated with a track of the first local primary source indicates that the particular track of the first local primary source contains transfer data transferred from the corresponding track of the local copy source in connection with an update of that track in an update operation. Thus, a reset bit of the local copy target bitmap data structure indicates that the original data of a track of the local copy source has been copied to a corresponding track of the first local primary source of the consistency group.

In another aspect, a track of existing data of first local primary source is mirrored to a corresponding track of the first remote secondary target, wherein mirroring includes determining a status of the bit of the local copy target bitmap data structure associated with the track of the first local primary source. If the bit status is determined to be reset, the existing data is mirrored from the primary side file to the corresponding track of the first remote secondary target. If the status is determined to be set, the existing data is mirrored from the corresponding track of the first local primary source.

In still another aspect, in response to a host conducting a read operation directed to the track of the first local primary source, a status of the bit of the local copy target bitmap data structure associated with the track of the first local primary source is determined. If the status of the bit is determined to be reset, the host read operation is directed to read the existing data from the track of the first local primary source. If the status of the bit is determined to be set, the host read operation is redirected to read the corresponding track of the local copy source.

In a further aspect, prior to overwriting existing data of the corresponding track of the first local primary source with the existing data of a corresponding track of the local copy source, a wait is performed for completion of the mirroring of the existing data to a corresponding track of the first remote secondary target, so that the overwriting of the existing data of the track of the first local primary source with the existing data of the corresponding track of the local copy source occurs after the existing data of the track of the first local primary source is read and mirrored to a corresponding track of the first remote secondary target.

Implementations of the described techniques may include hardware, a method or process, or computer software on a computer-accessible medium. Other features and aspects may be realized, depending upon the particular application.

DETAILED DESCRIPTION

Figure 1:
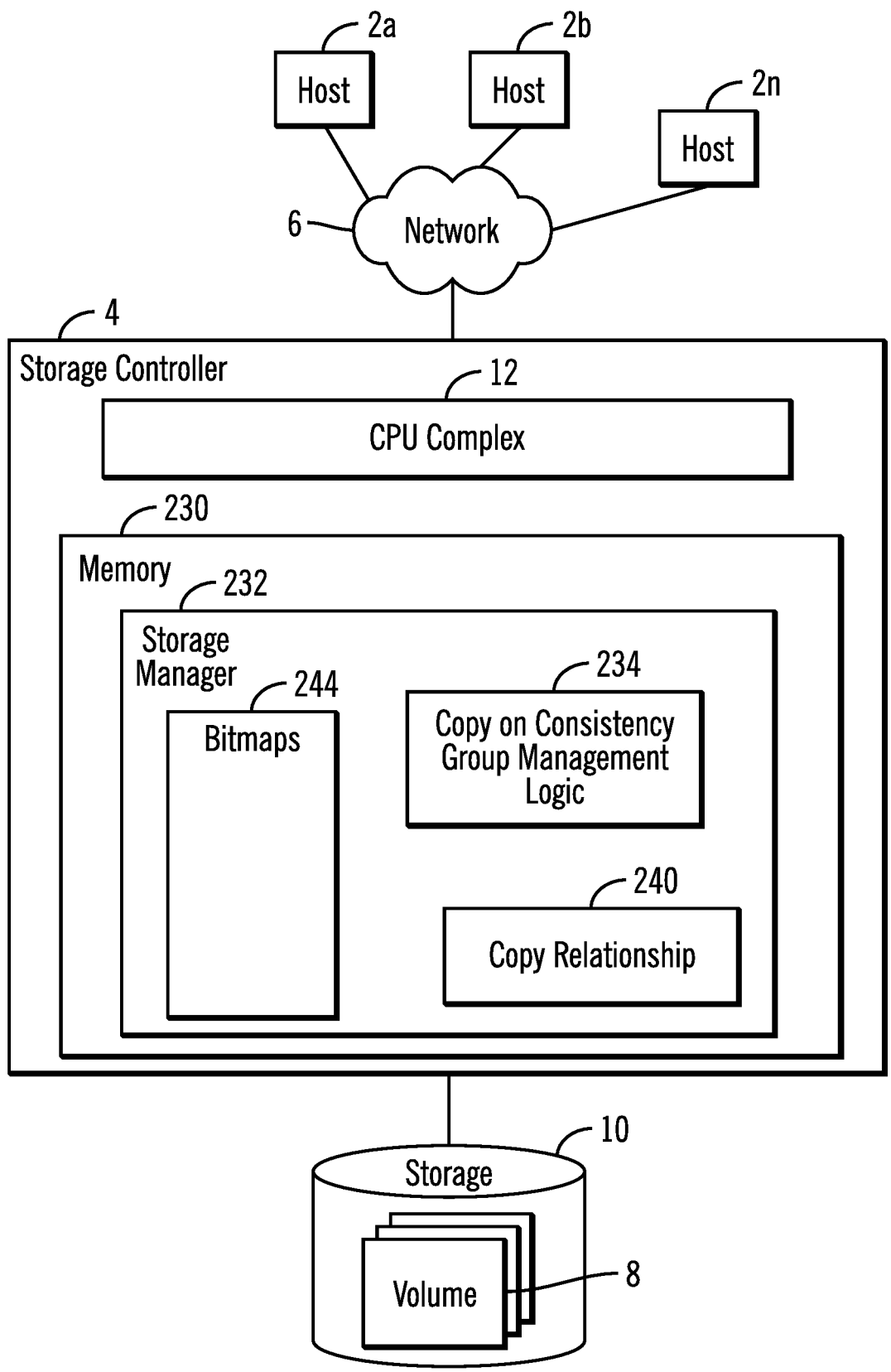
FIG. 1 illustrates an embodiment of a computing environment employing copy on consistency group management in accordance with one aspect of the present description.

A system of one or more computers may be configured for copy on consistency group management in accordance with the present description, by virtue of having software, firmware, hardware, or a combination of them installed on the system that in operation causes or cause the system to perform operations of copy on consistency group management. For example, one or more computer programs may be configured to perform copy on consistency group management by virtue of including instructions that, when executed by data processing apparatus, cause the apparatus to perform the actions.

In accordance with one embodiment, copy on consistency group management operations in accordance with the present description, permit copying from a local copy source to a local copy target notwithstanding that the local copy target is a local primary source of an incomplete consistency group of an ongoing asynchronous mirror relationship from the local primary source to a remote secondary target of the consistency group. Copy on consistency group management logic in accordance with the present description permits completion of the consistency group notwithstanding that the local copy operation from the local copy source to the local primary source was initiated after the consistency group was initiated. In one aspect of the present description, asynchronous data mirroring logic, prior to local data copying logic overwriting existing data of a track of a local primary source with existing data of a track of the local copy source, reads the existing data of the track of the local primary source volume for purposes of mirroring the read existing data to a corresponding track of the remote secondary target. As a result, existing data of the local primary source of the consistency group may be safely overwritten because the existing data "of the local primary source was previously read for mirroring to the remote secondary target. Other features and aspects may be realized, depending upon the particular application.

In one embodiment, the local copying from the local copy source to the local copy target creates a point-in-time snap copy on the local primary source with no background copying. Thus, in an asynchronous data replication system, a point-in-time snap copy volume may be made of a primary volume at the primary system with respect to the contents of the primary volume as of a particular point-in-time. It is appreciated that copy on consistency group management in accordance with the present description may be applied to other types of copying, depending upon the particular application.

A system of one or more computers may be configured for copy on consistency group management in accordance with the present description, by virtue of having software, firmware, hardware, or a combination of them installed on the system that in operation causes or cause the system to perform copy on consistency group management operations. Thus, the operations described herein are performed by logic which is configured to perform the operations either automatically or substantially automatically with little or no system operator intervention, except where indicated as being performed manually.

As used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a copy relationship identifies a source storage location, such as a primary storage location, and a target storage location, such as a another storage location, in which data stored at the source storage location is to be replicated or otherwise copied to the target storage location. Thus, as used herein, a source storage location and a target storage location are storage locations related by a copy relationship.

Furthermore, as used herein, the term "unit of storage" or "storage unit" refers to a storage location containing one or more units of data storage capable of storing one or more data units such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

As used herein, the term "copying" includes actual copying in which actual data content of a source storage location is actually transferred to a target storage location. However, the term "copying" as used herein also includes virtual copying in which a data structure such as a bitmap is set to redirect read operations initially directed to a target storage location, to a source storage location instead of to the target storage location, and thus need not include actual transfer of the data content of a source storage location to a target storage location. Similarly, as used herein, the term "copy" includes an actual copy in which a target storage location contains the same data content as a source storage location but also includes a virtual copy in which a target storage location has an associated data structure such as a local copy target bitmap which has been set to redirect read operations initially directed to the target storage location, to the source storage location instead of the target storage location, such that a virtual copy need not include the actual data content of the source storage location.

Figure 2:
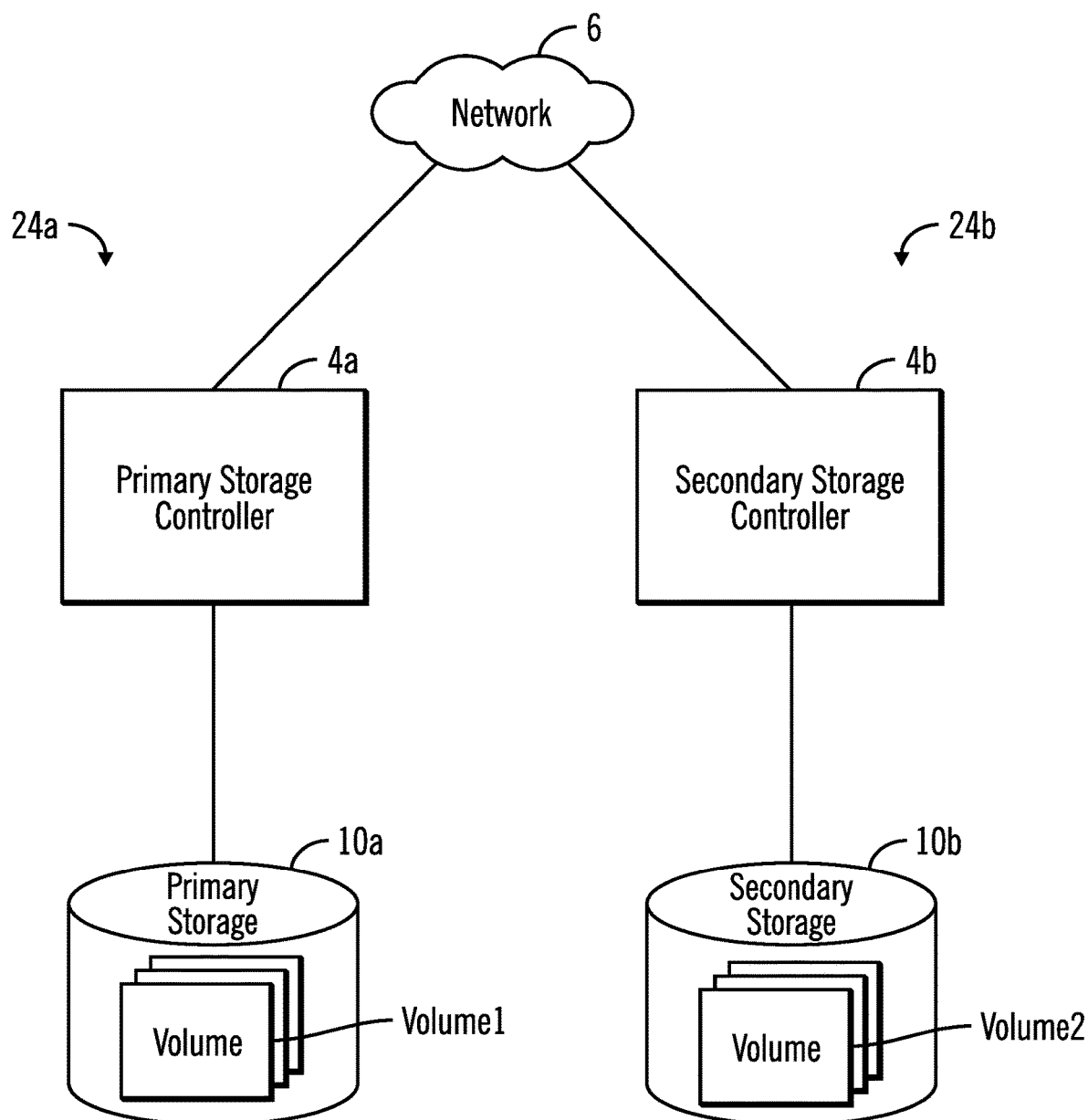
FIG. 2 illustrates an example of a storage system having a primary system and a secondary system employing copy on consistency group management in accordance with one aspect of the present description.

Implementations of the described techniques may include hardware, a method or process, or computer software on a computer-accessible medium. FIG. 1 illustrates an embodiment of a computing environment employing copy on consistency group management in accordance with the present description. A plurality of hosts 2a, 2b . . . 2n may submit Input/Output (I/O) requests to one or more storage controllers or storage control units 4, 4a (FIG. 2), 4b (FIG. 2) over a network 6 to access data at volumes 8 (e.g., Logical Unit Numbers, Logical Devices, Logical Subsystems, etc.) in storage represented by one or more storage drives 10, 10a, (FIG. 2), 10b (FIG. 2). Each storage controller 4, 4a, 4b includes a CPU complex 12 (FIG. 1), including one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

In the configuration illustrated in FIG. 2, the storage controller 4a and the data storage 10a have been configured as a primary storage control unit and the primary storage, respectively, of a primary system 24a. Similarly, the storage controller 4b and its data storage 10b have been configured as a secondary storage control unit and a secondary storage, respectively, of a secondary system 24b. Hence, in the configuration depicted in FIG. 2, the storage controller 4a will be referred to as a primary storage controller or control unit 4a, and the data storage 10a will be referred to as a primary storage 10a. Similarly, the storage controller or control unit 4b will be referred to as a secondary storage controller or control unit 4b and the data storage 10b will be referred to as a secondary data storage 10b.

In a particular copy relationship, such as a mirror relationship, the source unit is often referred to as the primary and the target unit is often referred to as the secondary. Replication relationships are defined between storage units of the data storage 10a and 10b. Notwithstanding a reference to the data storage 10a as "primary" and the data storage 10b as "secondary," particular storage units of the data storage 10a and the storage 10b may play both a primary (or source role) and a target (or secondary role) depending upon the particular copy relationship.

Figure 3:
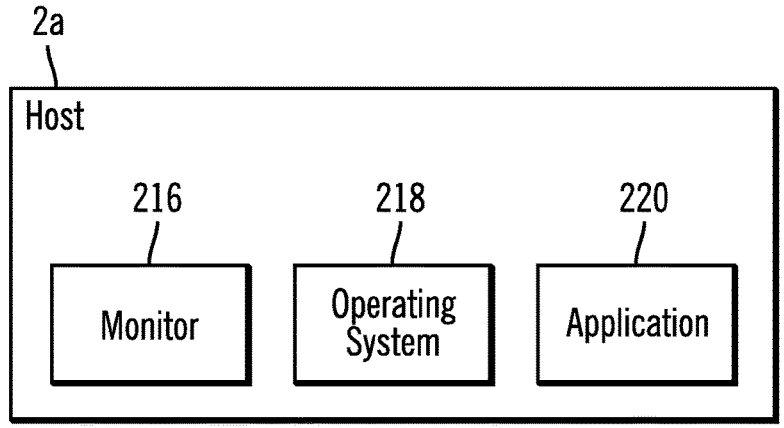
FIG. 3 illustrates an example of a host in the storage system of FIG. 1.

As noted above, the computing environment includes one or more hosts 2a, 2b, . . . 2n (FIG. 1) writing updates to the primary storage controller 4a (FIG. 2) for storage in the primary storage 10a. At least one such host such as the host 2a, has in this embodiment, storage management functions including a monitor program 216 (FIG. 3) to monitor failures in the availability of the primary storage controller 4a (FIG. 2) and its associated data storage 10a. In some embodiments, the monitor program 216 may be operated in a device apart from the hosts.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

A typical host as represented by the host 2a (FIG. 3) includes an operating system 218 and an application 220 that reads data from and writes updates via a storage controller 4a, 4b to the primary storage 10a or secondary storage 10b. A host which includes the monitor program 216 may omit update writing applications 220 in some embodiments.

Figure 4:
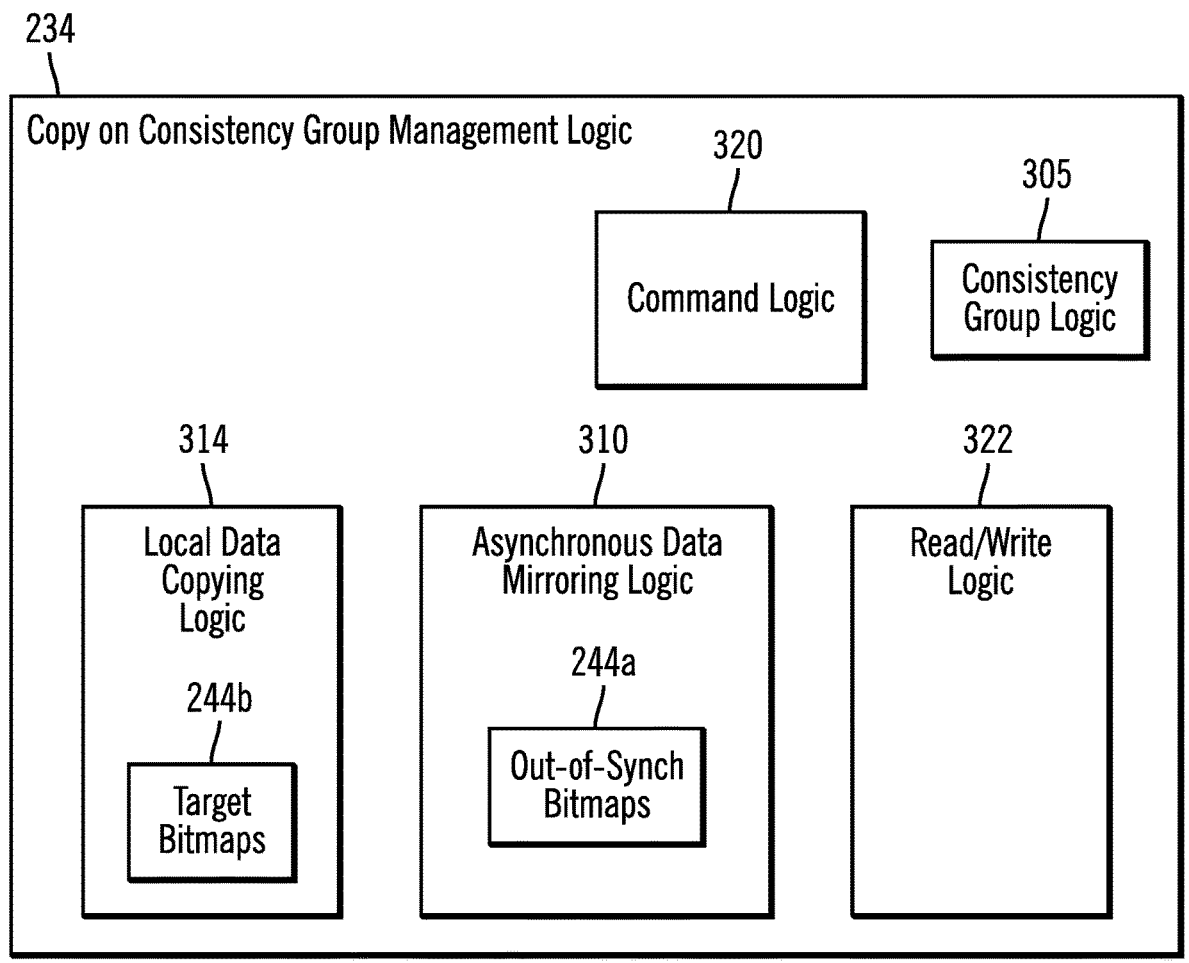
FIG. 4 illustrates an embodiment of copy on consistency group management logic in accordance with one aspect of the present description.

Referring to FIGS. 1, 2, and 4, the storage controllers 4 (FIG. 1), 4a (FIG. 2), 4b each have a memory 230 (FIG. 1) that includes a storage manager 232 for managing storage operations including data replication operations from a primary volume1 of a primary system 24a to a secondary volume2 at a secondary system 24b. A copy on consistency group management logic 234 of the storage manager 232 is configured to in this embodiment, perform point-in-time snap copy operations on a consistency group of an asynchronous mirror relationship which includes the primary volume1 of primary system. The pair of volumes, volume1 (FIG. 2), volume2 are in an asynchronous copy relationship such that updates to the primary volume1 by a host, are asynchronously mirrored to the secondary volume2.

In the illustrated embodiment, the storage manager 232 including the copy on consistency group management logic 234, is depicted as software stored in the memory 230 and executed by the CPU complex 12. However, it is appreciated that the logic functions of the storage manager 232 may be implemented as hardware, software, firmware or combinations of one or more thereof, depending upon the particular application.

One or more copy relationships 240, which may be maintained by the copy on consistency group management logic 234 for the primary and secondary storage controllers 4a, 4b (FIG. 2) associate primary storage locations in the primary storage 10a and corresponding secondary storage locations in the secondary storage 10b, such that updates by a host to the primary storage 10a locations are copied to the corresponding secondary storage 10b locations. For example, source storage locations in a primary storage volume1 (FIG. 2) of storage 10a may be mirrored in a mirror data replication operation to target storage locations of a secondary volume2 of the storage 10b pursuant to a mirror copy relationship 240 (FIG. 1).

In the illustrated embodiment, a copy relationship 240 comprises a peer-to-peer mirror relationship for a pair of storage locations in which updates to the primary (source) storage locations of the mirror relationship 240 are mirrored to the secondary (target) storage locations of the mirror relationship 240. It is appreciated that other types of copy relationships may be established, depending upon the particular application. For example, the copy relationships 240 may include point-in-time snap copy relationships or other local copying relationships.

In connection with a copy relationship 240 in an asynchronous data replication mode of the copy on consistency group management logic 234, updates to the primary storage locations of the primary storage 10a may be indicated in data structures such as a bitmap of a set of bitmaps 244, which is an out-of-sync (OOS) bitmap in the illustrated embodiment. Bits of the OOS bitmap are cleared as the storage manager 232 copies updates indicated in the OOS bitmap to the corresponding storage locations of the secondary storage 10b of secondary storage control unit 4b.

The storage manager 232 accesses updates to the primary storage 10a to write to the corresponding storage locations in the storage 10b. In some applications, the copying and relationship functions may be performed by devices external to the storage systems 24a, 24b (FIG. 2), such as the hosts, for example. In the illustrated embodiment, one copying relationship of the relationships 240 is a mirroring process in which each write update to the primary storage 10a is mirrored over to the secondary storage 10b. In the asynchronous mode of the illustrated embodiment, the I/O operation insofar as the host initiating the operation is concerned, is considered to be complete upon successful write of the update to the primary storage 10a. Accordingly, the host may be notified that the I/O operation was successfully completed notwithstanding that the update data has not yet been mirrored to the secondary storage 10b.

Periodically, volumes in a relationship 240 may be configured into a consistency group by consistency group logic 305 (FIG. 4) of the copy on consistency group management logic 234 to ensure that a group of updates made to volumes at the primary system are also eventually made on the volumes of the consistency group to maintain data consistency as of a particular point in time or a particular set of data for those volumes of the group. Accordingly, additional updates to an OOS bit map may be stopped at a particular point in time to form a consistency group between volumes of the primary system and the secondary system. Any unprocessed updates as indicated by the OOS bit map are transferred to the secondary storage so that the volumes of the consistency group are consistent as of the point in time at which updates were no longer added to the OOS bit map.

In contrast to the asynchronous mode, in a synchronous mode, an I/O operation which performed a write operation to the primary storage 10a is not considered complete until the mirror operation is completed, that is, it is not complete until the update data has been successfully replicated to the secondary storage 10b. Should the mirror operation fail such that the update is not successfully mirrored to the storage 10b, the host may be notified that the update operation was not successfully completed.

The storage manager 232 in one embodiment may transfer data from the primary storage 10a to the secondary storage 10b in tracks. As used herein, the term track may refer to a track of a disk storage unit but may also reference to other units of data (or data units) configured in the storage 10a, 10b, such as a bit, byte, word, segment, page, block (such as a Logical Block Address (LBA)), etc., which may be a part of a larger grouping of data units, such as those stored collectively as a volume, logical device, etc. of data.

In one embodiment, the storage devices 10a, 10b may be comprised of one or more sequential access storage devices, such as hard disk drives and magnetic tape or may include non-sequential access storage devices such as solid state drives (SSD), for example. Each storage device 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the copy on consistency group management logic 234 managing the copy relationships, may be implemented with asynchronous copy operations, such as a peer-to-peer remote copy (PPRC) program modified as appropriate in accordance with present description. An example of a PPRC program is the IBM Tivoli Productivity Center for Replication copy program that enables the switching of updates from the primary storage 10a to the secondary storage 10b. Suitable asynchronous mirroring programs include XRC (or zGM) modified as appropriate in accordance with present description. The described operations may be implemented with other programs such as other copy programs or other global recovery programs modified as appropriate in accordance with present description.

The system components 2a, 2b . . . 2n, 4, 4a, 4b, 10, 10a, 10b are connected to the network 6 which enables communication among these components. Thus, the network 6 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 2a, 2b, . . . 2n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 5A:
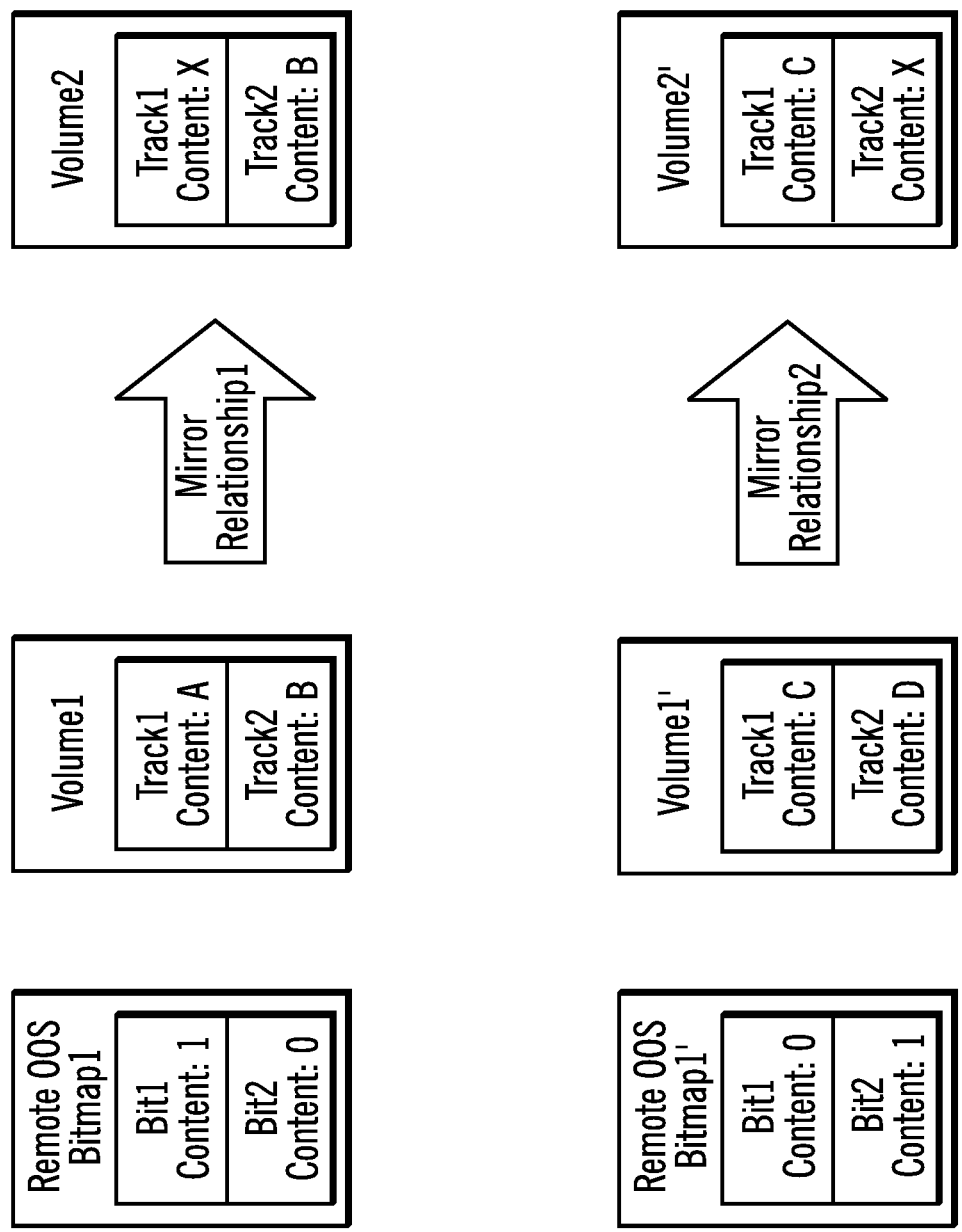
FIGS. 5a-5c depict examples of volumes, relationships and associated data structures in connection with of operations of the copy on consistency group management logic of FIG. 4.

FIG. 4 depicts one embodiment of copy on consistency group management logic 234 of the storage manager 232 (FIG. 1) which in addition to the consistency group logic 305, further includes asynchronous data mirroring logic 310 configured to asynchronously mirror data from a local primary source such as a local primary volume1 (FIG. 5a), for example, of a first storage unit such as the primary storage 10a (FIG. 2), for example, to a remote secondary target such as a remote secondary volume2 (FIG. 5a), for example, of a second storage unit such as the secondary storage 10b, for example. In the example of FIG. 5a, the asynchronous mirroring of data from the local primary volume1 to the remote secondary volume2 is represented by an arrow labeled "mirror relationship1" in FIG. 5a. Thus, in one embodiment, the asynchronous data mirroring logic 310 is configured to initiate a consistency group using asynchronous local to remote mirroring of data from a local primary source to a remote secondary target.

In the example of FIG. 5a, the content of track1 of local primary volume1 is indicated as existing data "A" at the point-in-time indicated in FIG. 5a. Similarly, the content of track2 of local primary volume1 is indicated as existing data "B" at the point-in-time indicated in FIG. 5a.

The data mirroring logic 310 of the copy on consistency group management logic 234 in mirroring data from the first data unit, such as a track, to the second data unit, is further configured to generate a first out-of-synch (OOS) bitmap of OOS bitmaps 244a of the bitmaps 244 (FIG. 1) such as the remote out-of-synch (OOS) bitmap1 (FIG. 5a) indicating remaining tracks to be mirrored from the local primary volume1 to the secondary volume2. For example, the remote OOS bitmap1 indicates by the reset bit state (bit state 0, in this example) of the bit2 of the bitmap1 that track2 of the local primary volume1 has been successfully mirrored over to the secondary volume2. Thus, the content of track2 of the remote secondary volume2 as represented by the value "B" is the same as the content "B" of track2 of the local primary volume1.

Conversely, the remote OOS bitmap1 indicates by the set bit state (bit state 1 in this example) of the bit1 of the bitmap1 that track1 of the local primary volume1 remains to be mirrored over to the secondary volume2. Thus, the content of track1 of the secondary volume2 as represented by the value "X" is not the same as the content "B" of track2 of the primary volume1. Accordingly, at the point-in-time depicted in FIG. 5a, the consistency group of local primary volume1 and remote secondary volume2 has not achieved consistency and is therefore not complete. Although the set and reset bit states are represented by the bit states 1 and 0, respectively, in the illustrated embodiment, it is appreciated that other bit values may be used to represent set and reset bit states.

In a similar manner, a second mirror relationship2 asynchronously mirrors data from a local primary source such as a local primary volume1' (FIG. 5a), for example, of a storage unit such as the primary storage 10a (FIG. 2), for example, to a remote secondary target such as a remote secondary volume2' (FIG. 5a), for example, of a second storage unit such as the secondary storage 10b, for example. In the example of FIG. 5a, the asynchronous mirroring of data from the local primary volume1' to the remote secondary volume2' is represented by an arrow labeled "mirror relationship2' in FIG. 5a. In the example of FIG. 5a, the content of track1 of local primary volume1' is indicated as existing data "C" at the point-in-time indicated in FIG. 5a. Similarly, the content of track2 of local primary volume1' is indicated as existing data "D" at the point-in-time indicated in FIG. 5a.

The data mirroring logic 310 of the copy on consistency group management logic 234 in mirroring data from the first data unit to the second data unit, is further configured to generate an out-of-synch (OOS) bitmap1' of OOS bitmaps 244a of the bitmaps 244 (FIG. 1) indicating remaining tracks to be mirrored from the local primary volume1' to the secondary volume2'. For example, the remote OOS bitmap1' indicates by the bit state 0 of the bit2 of the bitmap1' that track1 of the local primary volume1' has been successfully mirrored over to the secondary volume2'. Thus, the content of track1 of the remote secondary volume2' as represented by the value "C" is the same as the content "C" of track1 of the local primary volume1'.

Conversely, the remote OOS bitmap1' indicates by the bit state 1 of the bit1 of the bitmap1' that track2 of the local primary volume1' remains to be mirrored over to the secondary volume2'. Thus, the content of track1 of the secondary volume2' as represented by the value "X" is not the same as the content "D" of track2 of the primary volume1'. Accordingly, at the point-in-time depicted in FIG. 5a, the consistency group of local primary volume1' and remote secondary volume2' has not achieved consistency and is therefore not complete.

Figure 5B:
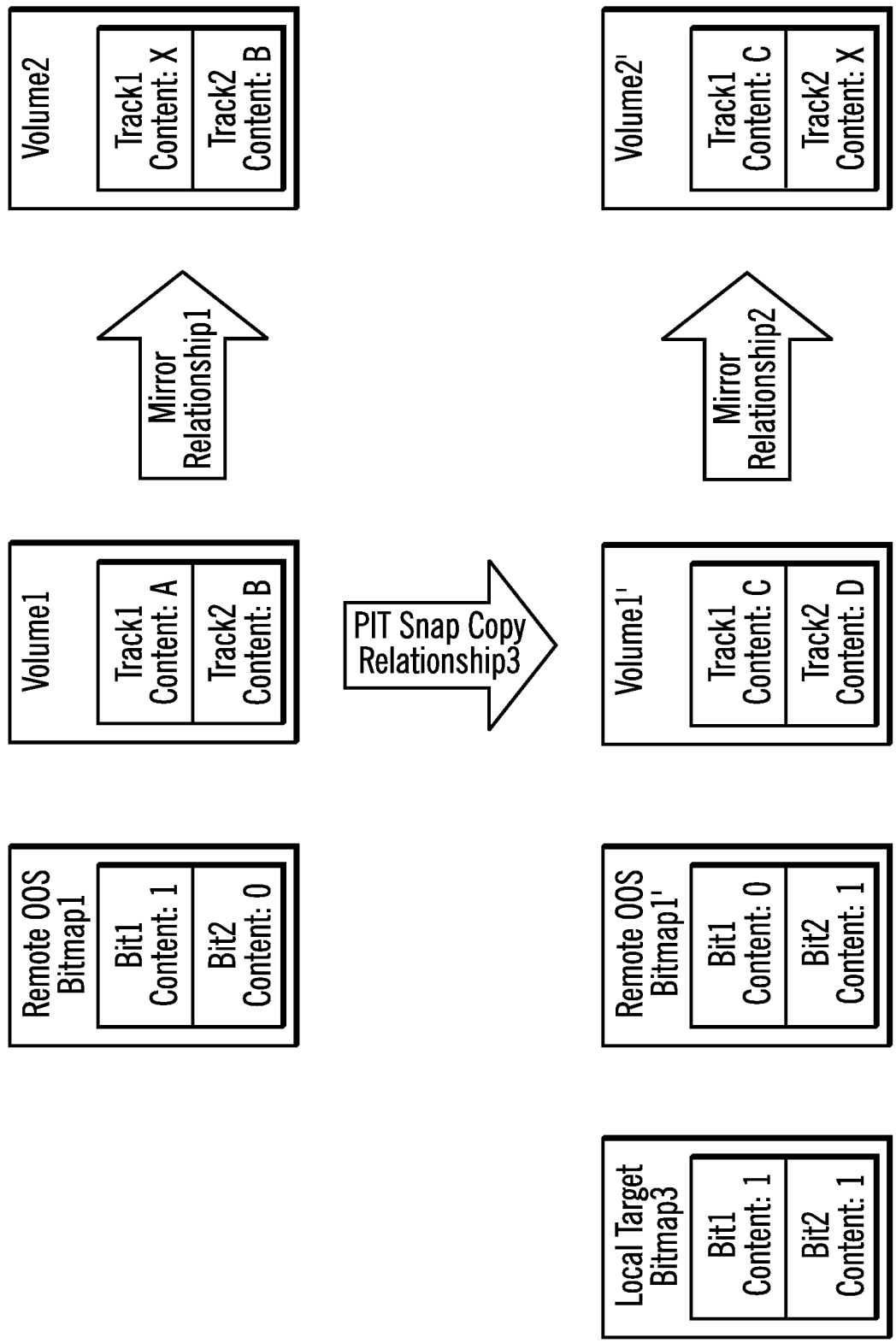

A local data copying logic 314 (FIG. 4) is configured to create a local copy, such as a point-in-time snap copy, for example, of a local copy source such as a primary volume, for example, to local copy target, such as a local primary source of a consistency group. Thus, in one example, the local data copying logic 314 is configured to copy data of the local primary volume1 (FIG. 5b) as of a first point-in-time to a target such as the point-in-time snap copy target volume1' of the primary system 24a (FIG. 2) to provide a first point-in-time snap copy of the primary volume1. In the example of FIG. 5b, the copy relationship between the local primary volume1 and the point-in-time snap copy target volume1' is represented by an arrow labeled point-in-time (PIT) snap copy relationship3.

Thus, the volume1' is a point-in-time snap copy target volume1' of the point-in-time (PIT) snap copy relationship3, and is also a local primary source volume1' of the mirror relationship2 of the consistency group of volume1' and volume2'. Accordingly, volume1' may be referred to alternately as the point-in-time snap copy target volume1' of the point-in-time (PIT) snap copy relationship3, or as the local primary source volume1' of the mirror relationship2 of the consistency group of volume1' and volume2', depending in some instances upon the particular role of the volume1' being discussed.

In one embodiment, to provide the first point-in-time snap copy of the local primary volume1 of the primary system 24a, a command logic 320 is configured to issue to the local data copying logic 314 a first point-in-time snap copy command to copy data of the local primary volume1 as of the first point-in-time to the point-in-time snap copy target volume1'. In response, the local data copying logic 314 is further configured to execute a first point-in-time snap copy command to copy data of the local primary volume1 as of the first point-in-time to the point-in-time snap copy target volume1' to provide the first point-in-time snap copy volume1'.

In one embodiment, the local data copying logic 314 is further configured to, in executing the first point-in-time snap copy command, generate a first target bitmap of target bitmaps 244b of the bitmaps 244 (FIG. 1) such as the local copy target bitmap3 (FIG. 5b), for example, indicating tracks which have not been copied from the local primary volume1 to the point-in-time snap copy target volume1' as of the first point-in-time. For example, the local copy target bitmap3 indicates by a set bit state (bit state 1 in this embodiment) of the bit1 of the bitmap3 that track1 of the local primary volume1 remains to be copied over to the point-in-time snap copy volume1'. Thus, the content of track1 of the point-in-time snap copy target volume1' as represented by the existing data value "C" retains the existing data such that the existing data of the corresponding track1 of the local point-in-time source volume1 remains to be copied by the local to local copying to track1 of the point-in-time snap copy target volume1'. If the existing data of the track1 of the local point-in-time source volume1 is copied over to the corresponding track1 of the point-in-time snap copy target volume1', the associated bit1 of the bitmap3 is reset (bit state 0 in this embodiment). Thus, a reset bit of the local copy target bitmap indicates that the associated track of the point-in-time snap copy target contains the original existing data of the point-in-time snap copy source. In this example, the local copy target bitmap3 indicates by the set bit state (bit state 1) of each of the remaining bits of the bitmap3 that each of the remaining tracks of the point-in-time snap copy source volume1 remain to be copied over to the point-in-time snap copy target volume1' in the example of FIG. 5b. Thus, the local copy target bitmap3 indicates by the set bit state (bit state 1) of each of the remaining bits of the bitmap3 that each of the remaining tracks of the point-in-time snap copy target volume1' contain the existing data of the point-in-time snap copy target volume1' instead of transferred data from the point-in-time snap copy source volume1 in the example of FIG. 5b.

In one embodiment, the point-in-time snap copy command which generates the point-in-time snap copy target volume1' may be of a "no background copy" type in which the content of the local primary volume1 need not be transferred to the point-in-time snap copy target volume1' in a background copy operation. Instead, a read operation directed to a track of the point-in-time snap copy target volume1' may be redirected to the corresponding track of the local primary volume1 to obtain the content of that track if the local copy target bitmap3 indicates by a bit state 1 that the track has not been transferred to the point-in-time snap copy volume1'. However, should a track of the primary volume1 be targeted for an update, the content of that track will be transferred to the corresponding track of the point-in-time snap copy target volume1' to overwrite the existing contents of that track and the local copy target bitmap3 will be updated to indicate that the content of that track has been transferred.

Accordingly, data for the volume1' to provide a consistent point-in-time snap copy of the data of the local primary volume1 as of the first point-in-time may be obtained by local to local data transfers within the primary system 24a. Thus, in one embodiment, local data copying logic 314 is configured to, after initiation of the consistency group by asynchronous mirroring, initiate a point-in-time snap copy by local to local copying from a local primary source such as local primary volume1, for example, to another local primary source such as local primary volume1', for example, as a local copy target of the local primary source such as local primary volume1, for example. Thus, the local data copying logic 314 is further configured to overwrite existing data on a track of the local target, local primary volume1' with existing data transferred from a corresponding track of the local source, local primary volume1.

In a manner similar to that described above in connection with FIG. 5a, at the point-in-time depicted in FIG. 5b the consistency group of local primary volume1 and remote secondary volume2 still has not achieved consistency and therefore remains incomplete. Similarly, the consistency group of local primary volume1' and remote secondary volume2' still has not achieved consistency and therefore remains incomplete at the point-in-time depicted in FIG. 5b.

It is appreciated that absent copy on consistency group management operations in accordance with the present description, overwriting of existing data in a local copy target volume of a local point-in-time snap copy operation in which the local target, such as volume1', for example, which is also a local primary volume of an incomplete consistency group of an ongoing asynchronous mirror relationship, may disrupt the completion of the consistency group where the local point-in-time snap copy operation was initiated after the consistency group was initiated. For example, absent copy on consistency group management operations in accordance with the present description, overwriting of existing data in volume1', a local copy target volume of the point-in-time snap copy relationship3, can disrupt completion of the previously initiated consistency group which includes volume1' as a primary source volume of that consistency group.

In one aspect of the present description, the asynchronous data mirroring logic 310 is further configured to, prior to the local data copying logic 314 overwriting existing data of a track of a local primary source (such as volume1') with existing data of a track of another local volume (such as primary source volume1), read the existing data of the track of the local primary source volume1' for purposes of mirroring the read existing data to a corresponding track of the remote secondary target volume2'. As a result, existing data such as the existing data represented by the data "D" of track2 of the local primary source volume1' may be safely overwritten with existing data (data "B") of the corresponding track2 of the local primary source volume1, because the existing data "D" of the corresponding track2 of the local primary source volume1 was previously read for mirroring the existing data "D" to a corresponding track2 of the remote secondary target volume2'.

Figure 5C:
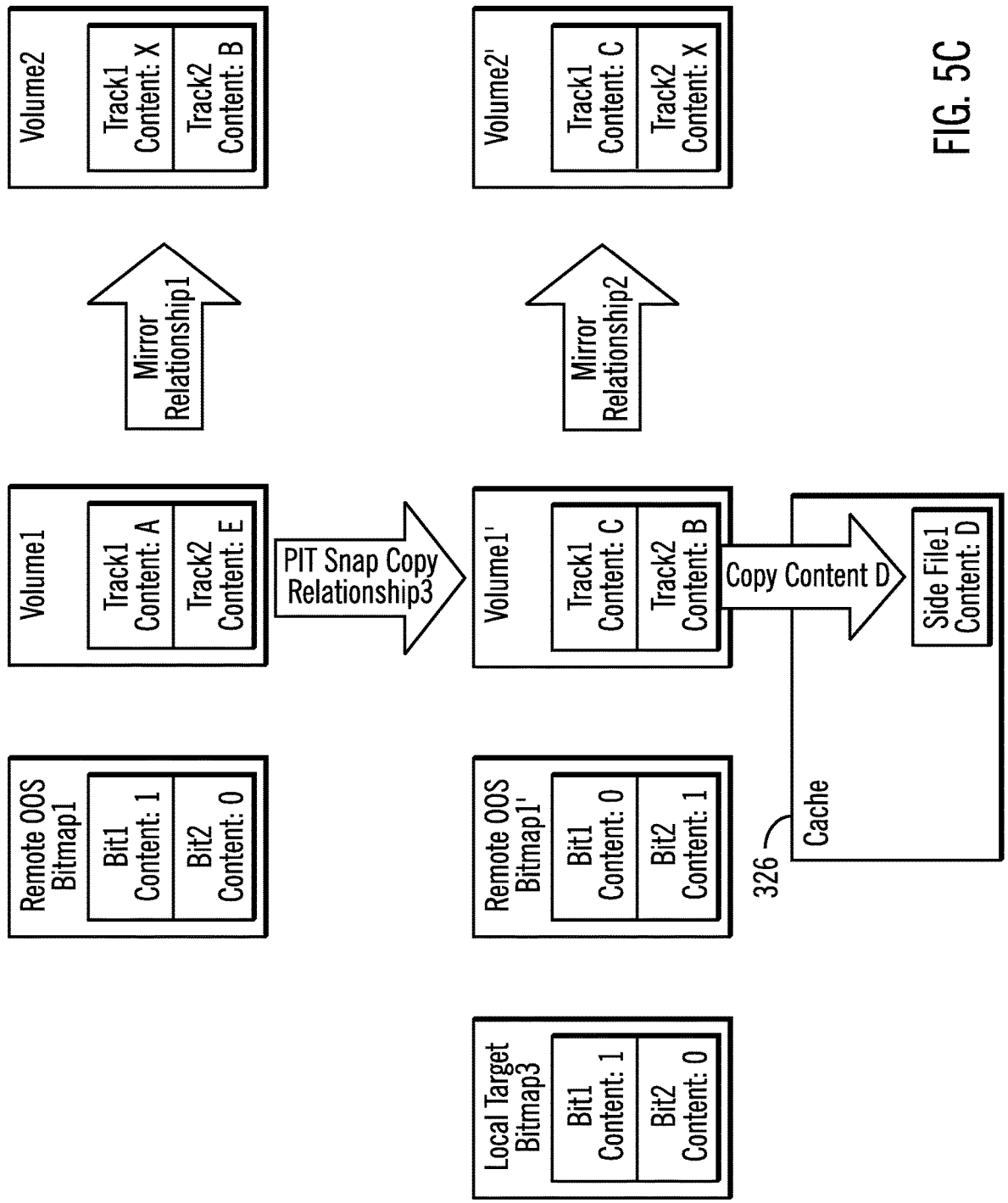

FIG. 5c depicts one example of selected operations of copy on consistency group management operations in accordance with the present description, to ensure completion of a consistency group notwithstanding initiation of a point-in-time snap copy operation directed to a volume of the consistency group after the consistency group has been initiated. In one embodiment, the copy on consistency group management logic 234 includes read/write logic 322 configured to, in response to an update operation from a host, update existing data of a track of a volume, such as the local primary source volume1, for example, with update data. In accordance with usual point-in-time snap copy operations, the read/write logic 322 is configured to, if the host directs an update to a track of the point-in-time snap copy source volume before the contents of that track have been transferred to the point-in-time snap copy target volume, the contents of the track of the source volume are transferred to the point-in-time snap copy target volume before the update is permitted to overwrite the contents of that track of the source volume.

Accordingly, in the example of FIGS. 5b. 5c, an update operation is received by the read/write logic 322 from a host to update the contents of track2 of the primary local source volume1 from the existing contents "B" (FIG. 5b) to the updated contents "E" (FIG. 5c). However, prior to updating the contents of track2 of the volume1, the existing contents "B" (FIG. 5b) of track2 are transferred to overwrite the contents of track2 of the point-in-time snap copy target volume1' with the content "B" obtained the corresponding track2 of the point-in-time snap copy source volume1. However, before overwriting the contents of track2 of the point-in-time snap copy target volume1' with the content "B", the existing content "D" (FIG. 5b) of the corresponding track2 of the point-in-time target volume1' is read to preserve the contents "D" for subsequent mirroring to the remote secondary target volume2' of the consistency group.

In one embodiment, the storage 10a (FIG. 2) includes local file storage such as a cache 326 configured to store side files such as the side file1 of FIG. 5c. In addition, the asynchronous data mirroring logic 310 is further configured to copy the existing data "D" read from track2 of the local primary source volume1' to the local primary side file1 for subsequent mirroring of the existing data "D" from the primary side file1 to the corresponding track2 of the remote secondary target volume2'. In one embodiment, the asynchronous data mirroring logic 310 is configured to mirror the existing data "D" from the primary side file1 to the corresponding track2 of the remote secondary target volume2'. In this manner, the existing data of a local primary source volume is preserved for mirroring to a remote secondary target volume of a consistency group notwithstanding that the local primary source volume is also the target volume of a point-in-time snap copy relationship initiated after the consistency group was initiated.

It is believed that copying existing data to a side file of a cache, for example, before the existing data is overwritten due to a point-in-time snap copy operation, can provide relatively high performance since the copy operation to the side file may be performed relatively quickly and thus have relatively little impact on performance. In an alternative embodiment, such as an embodiment in which cache space is limited, the local data copying logic 314 may be further configured to, prior to overwriting existing data such as existing data of a track of a local primary source of a consistency group with existing data of a corresponding track of another local primary source, wait for completion of the mirroring of the existing data to a corresponding track of the remote secondary target, so that the overwriting of the existing data of the track of the local primary source with the existing data of the corresponding track of the other local primary source occurs after the existing data of the track of the local primary source is read and mirrored to a corresponding track of the remote secondary target. For example, the local data copying logic 314 may be further configured to, prior to overwriting existing data "D" of track2 of the local primary source volume1' of the consistency group of volume1' and volume2', with existing data of track2 of the local primary source volume1, wait for completion of the mirroring of the existing data "D" to the corresponding track2 of the remote secondary target volume2', so that the overwriting of the existing data "D" of the track2 of the local primary source volume1' with the existing data "B" of the corresponding track2 of the other local primary source volume1 occurs after the existing data "D" of the track2 of the local primary source volume1' is read and mirrored to a corresponding track2 of the remote secondary target volume2'. It is appreciated that such wait states may have an adverse effect on performance. However, such an approach may reduce cache space utilization.

Figure 6:
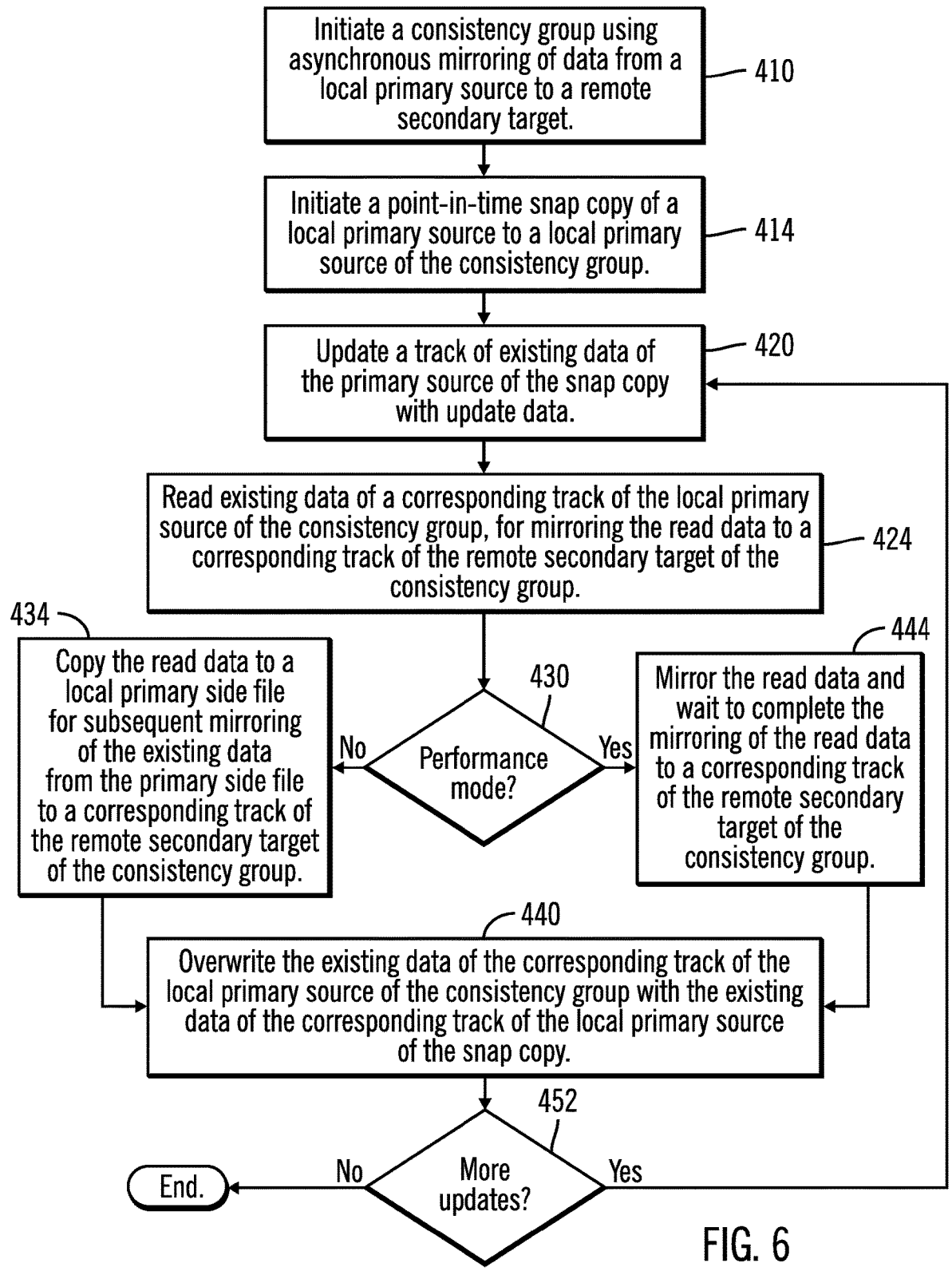
FIG. 6 depicts an example of operations of the copy on consistency group management logic of FIG. 4.

FIG. 6 depicts an example of selected operations of the copy on consistency group management logic 234. In one operation, the asynchronous data mirroring logic 310 (FIG. 4) initiates (block 410) a consistency group using asynchronous local to remote mirroring of data from a local primary source to a remote secondary target. In the example of FIG. 5a, the local primary source volume1' forms a consistency group with the remote secondary target volume2' in which data from the local primary source volume1' is asynchronously mirrored (mirror relationship2) to the remote secondary target volume2'.

Sometime after initiation of the consistency group, the local data copying logic 314 (FIG. 4) initiates (block 414) a point-in-time snap copy of a local primary source to a local primary source of a consistency group. In the example of FIG. 5b, the local primary volume1 is copied as of a particular point-in-time to the local primary volume1 of the consistency group of the mirror relationship2 to provide a point-in-time snap copy of the primary volume1. The copy relationship between the local primary volume1 and the point-in-time snap copy target volume1' is represented by the arrow labeled point-in-time (PIT) snap copy relationship3. Thus, the volume1' is a point-in-time snap copy target volume1' of the point-in-time (PIT) snap copy relationship3, and is also a local primary source volume1' of the mirror relationship2 of the consistency group of volume1' and volume2'.

In response to an update operation from a host, for example, existing data of a track of a primary source of the snap copy, such as the local primary source volume1 of the point-in-time snap copy relationship3 (FIG. 5b), for example, may be updated (block 420) with update data. In accordance with usual point-in-time snap copy operations, as a part of the update (block 420) operation, the read/write logic 322 transfers the contents of the track of the point-in-time snap copy source volume being updated to the point-in-time snap copy target volume before the update is permitted to overwrite the contents of that track of the point-in-time snap copy source volume. However, before overwriting the corresponding track of the point-in-time target volume with the transferred contents from the point-in-time source volume, existing data of the point-in-time snap copy target volume which is also the local primary source of the consistency group, is read (block 424) for subsequent mirroring of the read data to a corresponding track of the remote secondary target of the consistency group.

In the example of FIGS. 5b. 5c, an update operation is received by the read/write logic 322 from a host to update (block 420) the contents of track2 of the primary local source volume1 (of the point-in-time snap copy relationship 3) from the existing contents "B" (FIG. 5b) to the updated contents "E" (FIG. 5c). However, prior to updating the contents of track2 of the volume1, the existing contents "B" (FIG. 5b) of track2 are transferred for subsequent overwriting of the contents of track2 of the point-in-time snap copy target volume1' with the content "B" obtained from the corresponding track2 of the point-in-time snap copy source volume1. However, because the point-in-time snap copy target volume1' is also the local primary source volume1' of the consistency group of the mirror relationship2, before overwriting the contents of track2 of the point-in-time snap copy target volume1' (that is, the point-in-time snap copy source volume1) with the transferred content "B", the existing content "D" (FIG. 5b) of the corresponding track2 of the point-in-time snap copy target volume1' is read (block 424)

to preserve the contents "D" for subsequent mirroring to the remote secondary target volume2' of the consistency group.

If the copy on consistency group management logic 234 (FIG. 4) is being operated for higher performance (block 430), the asynchronous data mirroring logic 310 copies (block 434) the read data to a local primary side file for subsequent mirroring of the existing data from the primary side file to a corresponding track of the remote secondary target of the consistency group. Having preserved the read existing data of the local primary source of the consistency group for subsequent mirroring of the read existing data from the primary side file to a corresponding track of the remote secondary target of the consistency group, the existing data of the corresponding track of the local primary source of the consistency group may be safely overwritten (block 440) with the transferred existing data transferred from the corresponding track of the local source of the point-in-time snap copy.

In the example of FIG. 5c, the existing data "D" read from track2 of the local primary source volume1' is copied (block 434) to the local primary side file1 for subsequent mirroring of the existing data "D" from the primary side file1 to the corresponding track2 of the remote secondary target volume2'. The existing data "D" read from track2 of the local primary source volume1' is then safely overwritten (block 440) with the transferred contents "B" transferred from the source volume of the point-in-time copy relationship3. In this manner, the existing data of a local primary source volume of a consistency group is preserved for mirroring to a remote secondary target volume of the consistency group notwithstanding that the local primary source volume is also the target volume of a point-in-time snap copy relationship initiated after the consistency group was initiated.

If operation of the copy on consistency group management logic 234 (FIG. 4) at higher performance (block 430) is not a priority, instead of copying (block 434) existing data to a side file before the existing data is overwritten due to a point-in-time snap copy operation, the local data copying logic 314 can mirror (block 444) the read data from the local primary source volume and wait to complete that mirroring of the read data to a corresponding track of the remote secondary target of the consistency group, before overwriting (block 440) the existing data of the corresponding track of the local primary source of the consistency group with the existing data transferred from the corresponding track of the local source of the point-in-time snap copy.

In the example of FIG. 5c, prior to overwriting existing data "D" of track2 of the local primary source volume1' of the consistency group of volume1' and volume2', with existing data "B" of track2 of the source volume1 of the point-in-time snap copy relationship3, the mirror logic 310 (FIG. 4) can (instead of copying the data "D" to the side file1), wait (block 444) for completion of the mirroring of the existing data "D" to the corresponding track2 of the remote secondary target volume2', so that the overwriting of the existing data "D" of the track2 of the local primary source volume1' with the existing data "B" of the corresponding track2 of the other local primary source volume1 occurs after the existing data "D" of the track2 of the local primary source volume1' is read and mirrored to a corresponding track2 of the remote secondary target volume2'. It is appreciated that such wait states may have an adverse effect on performance. However, such an approach may reduce cache space utilization.

If (block 452) there are additional updates, the process described above repeats. Otherwise, the process ends.

Figure 7:
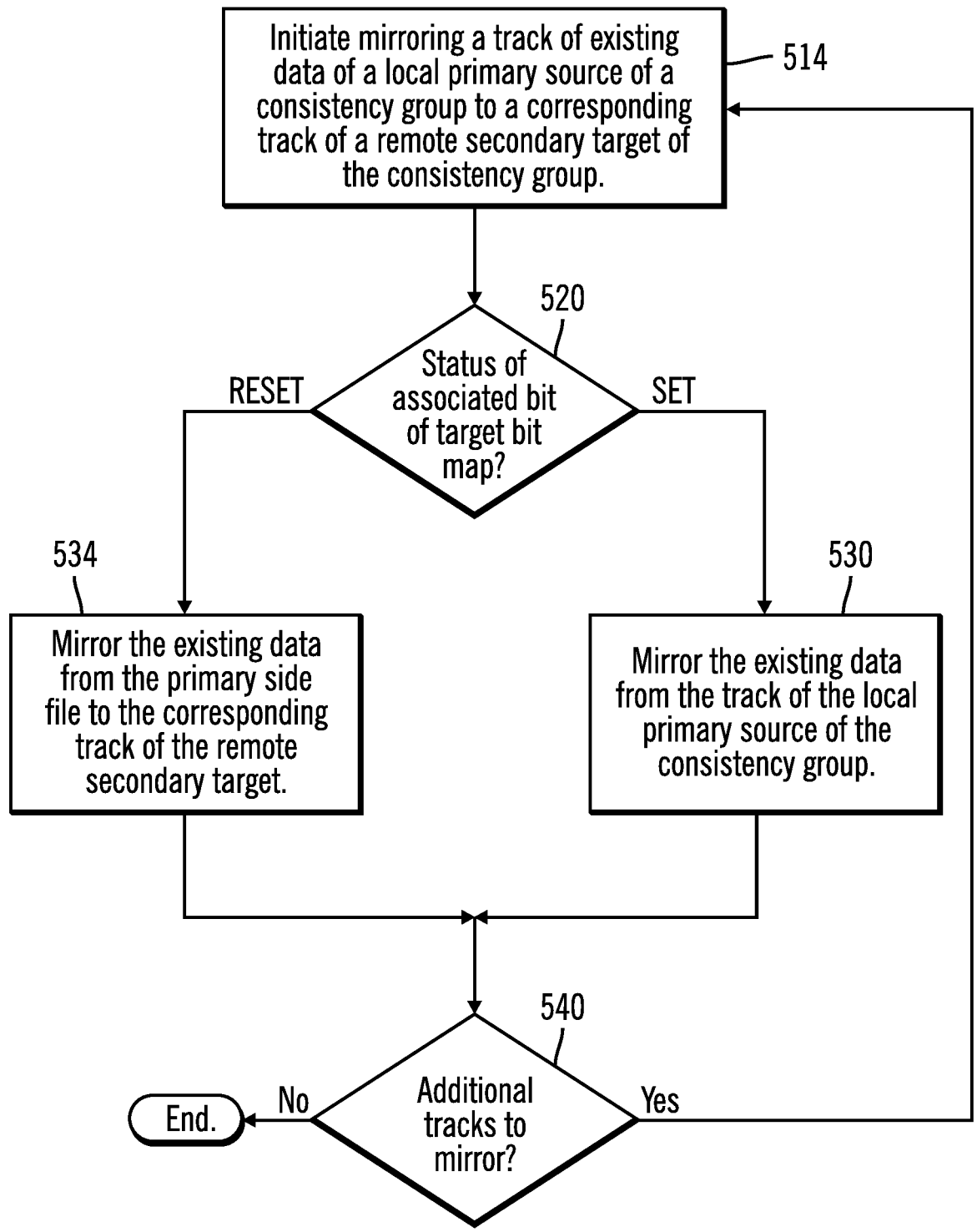
FIG. 7 depicts another example of operations of the copy on consistency group management logic of FIG. 4.

FIG. 7 depicts another example of selected operations of the copy on consistency group management logic 234. In one operation, the asynchronous data mirroring logic 310 (FIG. 4) initiates mirroring (block 514) a track of existing data of a local primary source of a consistency group to a corresponding track of a remote secondary target of the consistency group. In one example, the existing contents "D" (FIG. 5b) of track2 of the local primary source volume1' of the consistency group of mirror relationship2, are to be mirrored to the corresponding track2 of the remote secondary target volume2' as indicated by the set state (bit state 1) of bit2 of the remote out-of-synch (OOS) bitmap1'.

To determine where to read the existing data to be mirrored, the status of a bit of the local copy target bitmap data structure associated with the track to be mirrored from the local primary source of the consistency group, is determined (block 520). As previously mentioned, the bit states of the local copy target bitmap indicate whether the contents of each track associated with a bit of the target bitmap, have been transferred from the point-in-time snap copy source to the point-in-time snap copy target. Thus, a set bit state (bit state 1) in this embodiment) of the target bit maps indicates that the contents of the track associated with that bit of the target bitmap, has not yet been transferred from the corresponding track of the point-in-time snap copy source to the corresponding track of the point-in-time snap copy target. Accordingly, if the local copy target bitmap bit is in the set state, the contents of the track associated with that bit of the target bitmap, are the original, existing contents of the corresponding track of the point-in-time snap copy target instead of the contents of the corresponding track of the point-in-time snap copy source.

Conversely, a reset bit state (bit state 0 in this embodiment) of the local copy target bitmap indicates that the contents of the track associated with that bit of the target bitmap, have already been transferred from the corresponding track of the point-in-time snap copy source to the corresponding track of the point-in-time snap copy target. Accordingly, if the local copy target bitmap bit is in the reset state, the contents of the track associated with that bit of the target bitmap, are the transferred contents transferred from the corresponding track of the point-in-time snap copy source instead of the original contents of the corresponding track of the point-in-time snap copy target.

Thus, if it is determined that the status of the bit of the local copy target bitmap associated with the track to be mirrored has a set status, that set status indicates that the contents of the track associated with that bit of the target bitmap, has not yet been transferred from the corresponding track of the point-in-time snap copy source to the corresponding track of the point-in-time snap copy target. Accordingly, if the local copy target bitmap bit is in the set state, the contents of the track associated with that bit of the target bitmap, continue to be the original, existing contents of the corresponding track of the point-in-time snap copy target instead of the contents of the corresponding track of the point-in-time snap copy source. As a result, the data of the track to be mirrored may be read (block 530) and mirrored from the corresponding track of the point-in-time snap copy target which is the local primary source of the consistency group.

Conversely, if it is determined that the status of the bit of the local copy target bitmap associated with the track to be mirrored has a reset status, that reset status indicates that the contents of the track associated with that bit of the target bitmap, has been overwritten by the contents transferred from the corresponding track of the point-in-time snap copy source to the corresponding track of the point-in-time snap copy target. Accordingly, if the local copy target bitmap bit is in the reset state, the original contents of the track associated with that bit of the target bitmap, have been replaced with the contents of the corresponding track of the point-in-time snap copy source. However, prior to the overwriting of the corresponding track of the point-in-time snap copy target, the original content of that track was copied to a side file as described above. As a result, the data of the track to be mirrored may be read (block 534) and mirrored from the primary side file to the corresponding track of the remote secondary target.

In one example, the existing contents "D" (FIG. 5b) of track2 of the local primary source volume1' of the consistency group of mirror relationship2, are to be mirrored to the corresponding track2 of the remote secondary target volume2' as indicated by the set state (bit state 1) of bit2 of the remote out-of-synch (OOS) bitmap1'. The reset bit state (bit state 0 in this embodiment) of the bit2 of the target bitmap3 indicates that the contents of the track2 associated with that bit2 of the target bitmap3, have already been transferred from the corresponding track2 of the point-in-time snap copy source volume1 to the corresponding track2 of the point-in-time snap copy target volume1'. Accordingly, since the local copy target bitmap bit2 is in the reset state, the contents of the track2 associated with that bit of the target bitmap, are the contents "B" transferred from the corresponding track2 of the point-in-time snap copy source volume1 instead of the original contents "D" of the corresponding track2 of the point-in-time snap copy target volume1'.

Thus, as shown in FIG. 5c, the original contents "D" of the track2 of the volume1' associated with that bit of the target bitmap3, have been replaced with the contents "B" of the corresponding track2 of the point-in-time snap copy source volume1. However, prior to the overwriting of the corresponding track2 of the point-in-time snap copy target volume1', the original contents "D" of that track2 was copied to side file1 as described above. As a result, the data "D" of the track2 to be mirrored may be read (block 534) and mirrored from the primary side file1 to the corresponding track2 of the remote secondary target volume2'.

In another example, the existing contents "C" (FIG. 5b) of track1 of the local primary source volume1' of the consistency group of mirror relationship2, have already been mirrored to the corresponding track1 of the remote secondary target volume2' as indicated by the reset state (bit state 0) of bit1 of the remote out-of-synch (OOS) bitmap1'. At the time the contents "C" (FIG. 5b) of track1 of the local primary source volume1' was mirrored, the set bit state (bit state 1 in this embodiment) of the bit1 of the target bitmap3 indicated that the contents of the track1 associated with that bit1 of the target bitmap3, have not yet been replaced by the contents of the corresponding track1 of the point-in-time snap copy source volume1. Accordingly, since the local copy target bitmap bit1 is in the set state, the contents of the track1 associated with that bit of the target bitmap, are the original contents "C" rather than the contents "A" of the corresponding track1 of the point-in-time snap copy source volume1.

Thus, as shown in FIG. 5c, the original contents "C" of the track1 of the volume1' associated with that bit of the target bitmap3, have not been replaced with the contents "A" of the corresponding track1 of the point-in-time snap copy source volume1. As a result, the data "C" of the track1 was read (block 530) and mirrored from track1 of the primary source volume1' (instead of a side file) to the corresponding track1 of the remote secondary target volume2'.

If the out-of-synch bitmap1' indicates (block 540) that additional tracks are to be mirrored, the process described above repeats. Otherwise, the process ends.

Figure 8:
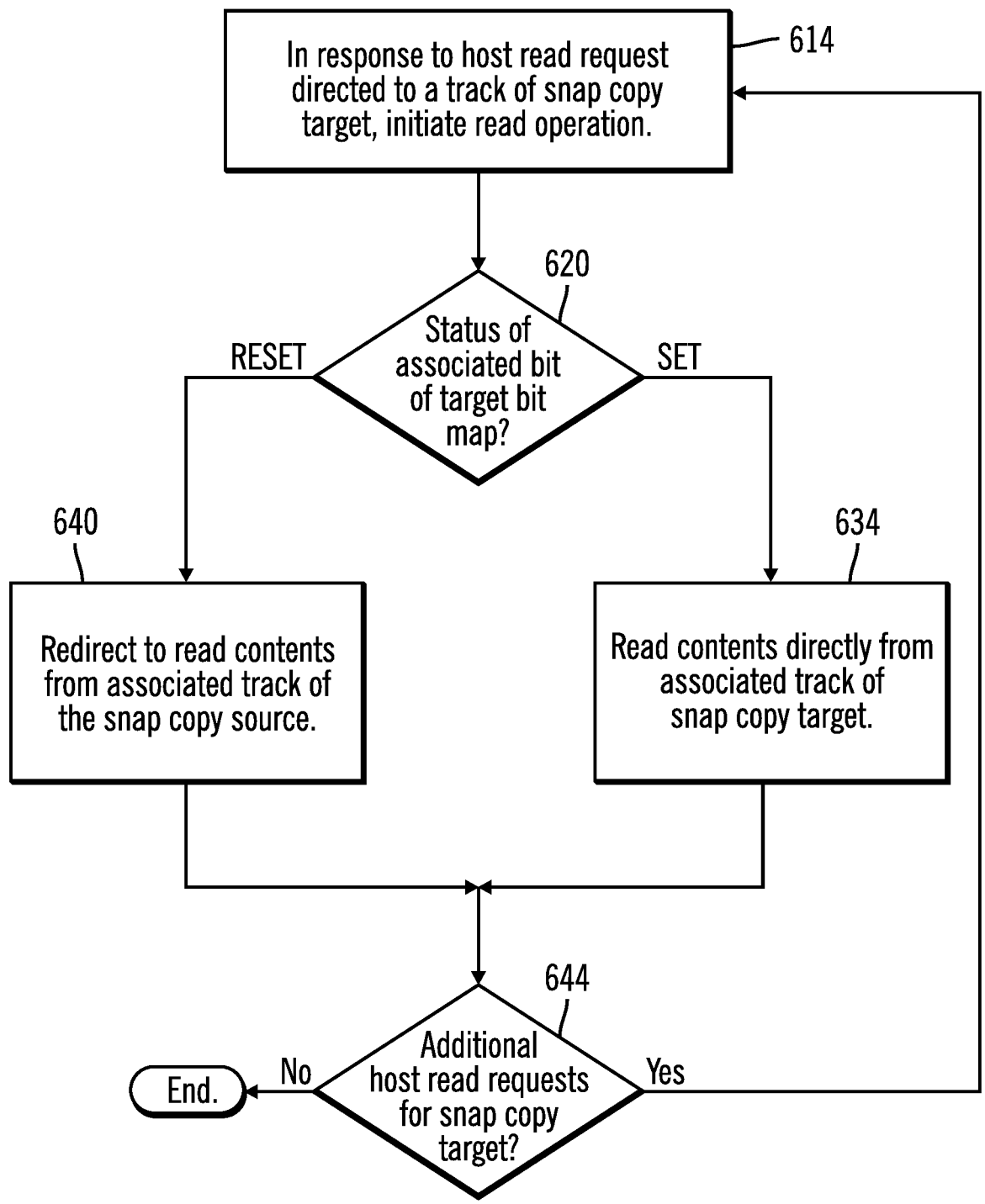
FIG. 8 depicts yet another example of operations of copy on consistency group management logic of FIG. 4.

FIG. 8 is directed to another example of selected operations of the copy on consistency group management logic 234. In one operation, the read/write logic 322 (FIG. 4) in response to a host read request directed to the primary storage controller 4a (FIG. 2), initiates (block 614) a read operation directed to a track of the local primary source of a consistency group. For example, the read/write logic 322 (FIG. 4) initiates a read operation directed to track2 (FIG. 5c) of the local primary source volume1' of the consistency group of the mirror relationship2.

As previously mentioned, the point-in-time snap copy command which generates the point-in-time snap copy target such as the target volume1' may be of a "no background copy" type in which the content of the local primary volume1 need not be transferred to the point-in-time snap copy target volume1' in a background copy operation. The bit states of the associated target bitmap indicate whether the content of the primary volume of the point-in-time snap copy has been transferred to the target of the point-in-time snap copy.

Accordingly, to locate the contents of the host requested read operation directed to the point-in-time snap copy target, the read/write logic 322 (FIG. 4) determines (block 620) the status of the bit of target bit map associated with the track of the requested read operation. Thus, if the track of the requested host read operation is track2 (FIG. 5c) of the point-in-time snap copy target volume1', for example, it is noted (block 620) that bit2 of the local copy target bitmap3 associated with track2 is reset, indicating that track2 of the point-in-time snap copy target volume1' has already been updated with the contents "B" from the point-in-time snap copy source volume1. Thus, the contents "B" have replaced the original contents "D" (FIG. 5b) of track2 of the of the point-in-time snap copy volume1'. Accordingly, in response to a host read request directed to track2 of the point-in-time snap copy target volume1', the read/write logic 322 (FIG. 4) reads (block 634) the contents "B" directly from the associated track2 of snap copy target volume1'.

In another example, if the track of the requested host read operation is track1 (FIG. 5c) of the point-in-time snap copy target volume1', it is noted (block 620) that bit1 of the local copy target bitmap3 associated with track1 is still set (bit state 1), indicating that track1 of the point-in-time snap copy target volume1' has not yet been updated with the contents "A" from the point-in-time snap copy source volume1. Thus, the original contents "C" (FIG. 5b) of track2 of the of the point-in-time snap copy target volume1' remain in track2 of the of the point-in-time snap copy target volume1'. Accordingly, the read/write logic 322 (FIG. 4) redirects (block 640) the read operation to read the contents "A" from the associated track2 of the snap copy source volume1 instead of the snap copy target volume1'.

If there are additional (block 644) host read requests directed to the snap copy target, the read operations discussed above are repeated. Otherwise, the read process of FIG. 8 ends.

It is appreciated that in other embodiments, the point-in-time snap copy command which generates the point-in-time snap copy target volume1' may a "background copy" type in which the content of the local primary volume1 is transferred in a background copy operation to the point-in-time snap copy volume1'. As the content of each track of the primary volume is transferred in a background copy to the content of the corresponding track of the point-in-time snap copy volume1', the bit state of the bit representing that track in the local copy target bitmap3 may be updated to a bit state value "0" to indicate that the track has been transferred to the point-in-time snap copy volume1'.

Figure 9:
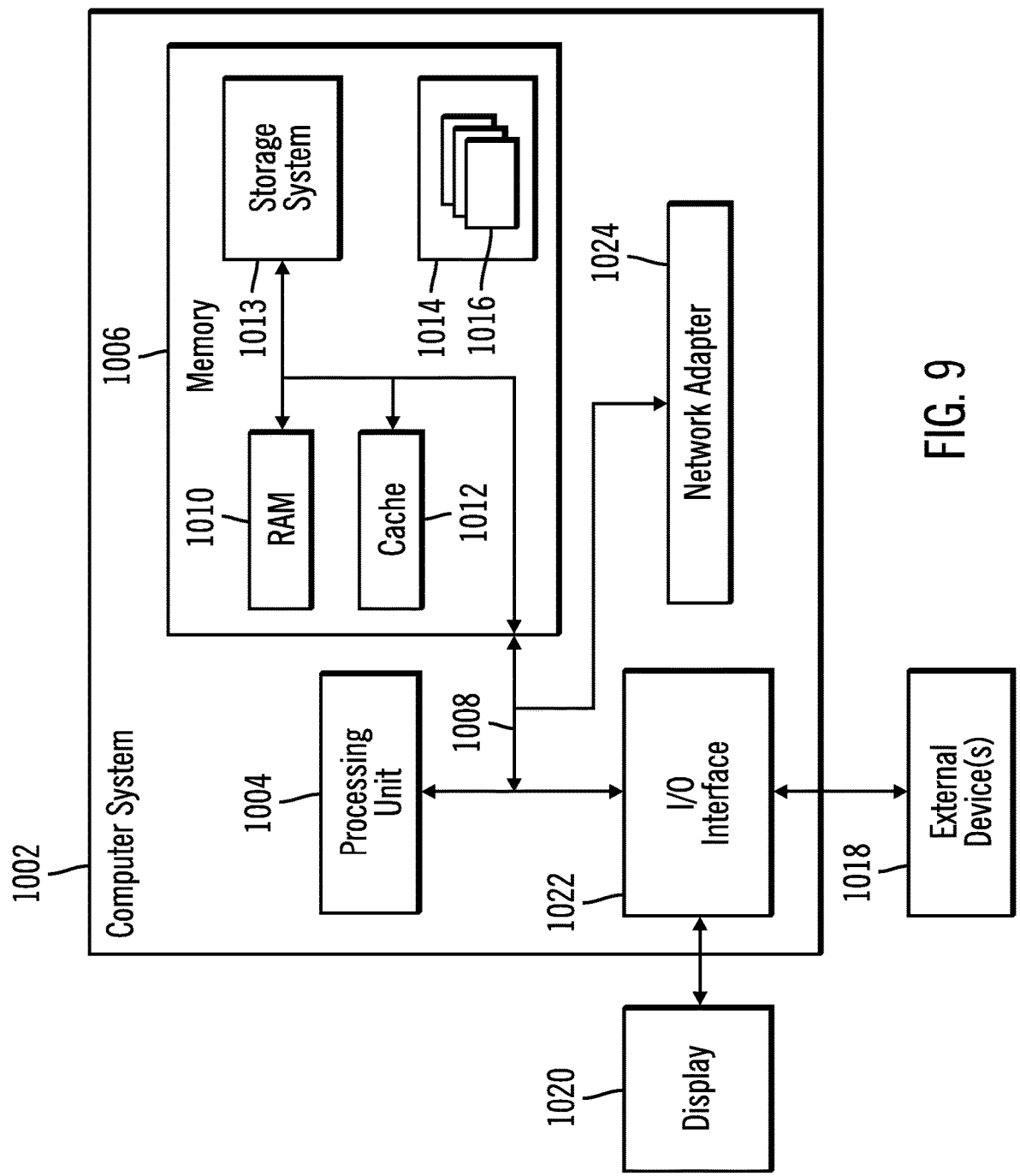
FIG. 9 illustrates another computer embodiment employing copy on consistency group management in accordance with the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    initiating a consistency group using asynchronous local to remote mirroring of data from a first local primary source data unit to a first remote secondary target data unit wherein a first track of the first local primary source data unit stores first existing data in the first track;
    after initiating the consistency group using asynchronous mirroring, initiating local to local copying from a local copy source data unit to the first local primary source data unit as a local copy target data unit of the local copy source data unit wherein a second track of the local copy source data unit stores second existing data in the second track, said local to local copying including overwriting tracks of the first local primary source data unit with existing data from corresponding tracks of the local copy source data unit;
    updating the second existing data of the second track of the local copy source data unit with update data;
    prior to overwriting the first existing data of the first track of the first local primary source data unit with the second existing data of the second track of the local copy source data unit, reading the first existing data of the first track of the first local primary source data unit for mirroring the first existing data to a corresponding track of the first remote secondary target data unit; and
    overwriting the first existing data of the first track of the first local primary source data unit with the second existing data of the second track of the local copy source data unit after reading the first existing data of the corresponding first track of the first local primary source data unit for mirroring the first existing data to a corresponding track of the first remote secondary target data unit.

2. The method of claim 1 wherein the local to local copying includes creating a point-in-time snap copy of the local copy source data unit to the first local primary source data unit of the consistency group, as a local copy target data unit of the local copy source data unit, the method further comprising local to local copying the first existing data read from the first track of the first local primary source data unit to a local primary side file for subsequent mirroring of the first existing data from the local primary side file to the corresponding track of the first remote secondary target data unit.

3. The method of claim 2 wherein the initiating local to local copying from the local copy source data unit to the first local primary source data unit as a local copy target data unit of the local copy source data unit includes providing a local copy target data unit bitmap data structure associated with the first local primary source data unit as a local copy target data unit of the local copy source data unit wherein a set bit of the local copy target data unit bitmap data structure associated with the first track of the first local primary source data unit indicates that the first track of the first local primary source data unit retains the first existing data such that the second existing data of the second track of the local copy source data unit remains to be copied by the local to local copying to the first track of the first local primary source data unit and wherein a reset bit of the local copy target data unit bitmap data structure associated with the first track of the first local primary source data unit indicates that the first track of the first local primary source data unit contains the second existing data such that the second existing data of the second track of the local copy source data unit has been copied by the local to local copying to the first track of the first local primary source data unit.

4. The method of claim 3 further comprising mirroring the first existing data to a corresponding track of the first remote secondary target data unit, said mirroring including determining a status of the bit of the local copy target data unit bitmap data structure associated with the first track of the first local primary source data unit, and if determined to be reset, mirroring the first existing data from the local primary side file to the corresponding track of the first remote secondary target data unit and if determined to be set, mirroring the first existing data from the first track of the first local primary source data unit.

5. The method of claim 3 further comprising in response to a host conducting a read operation directed to the first track of the first local primary source data unit, determining a status of the bit of the local copy target data unit bitmap data structure associated with the first track of the first local primary source data unit, and if determined to be reset, direct the host read operation to read the second existing data from the first track of the first local primary source data unit and if determined to be set, redirect the host read operation to read the second track of the local copy source data unit.

6. The method of claim 1 further comprising prior to overwriting the first existing data of the corresponding first track of the first local primary source data unit with the second existing data of the second track of the local copy source data unit, waiting to complete mirroring of the first existing data to a corresponding track of the first remote secondary target data unit, so that the overwriting the first existing data of the first track of the first local primary source data unit with the second existing data of the second track of the local copy source data unit occurs after the first existing data of the first track of the first local primary source data unit is read and mirrored to a corresponding track of the first remote secondary target data unit.

7. A storage controller for use with storage including a first local primary source data unit, a first remote secondary target data unit and a local copy source data unit, and a host, comprising:
    asynchronous data mirroring logic configured to initiate a consistency group using asynchronous local to remote mirroring of data from a first local primary source data unit to a first remote secondary target data unit wherein a first track of the first local primary source data unit stores first existing data in the first track;
    local data copying logic configured to after initiation of the asynchronous mirroring, initiate local to local copying from a local copy source data unit to the first local primary source data unit as a local copy target data unit of the local copy source data unit wherein a second track of the local copy source data unit stores second existing data in the second track, said local to local copying including overwriting tracks of the first local primary source data unit with existing data from corresponding tracks of the local copy source data unit; and read/write logic configured to, in response to an update operation from a host, update the second existing data of the second track of the local copy source data unit with update data; and wherein the asynchronous data mirroring logic is further configured to, prior to the local data copying logic overwriting the first existing data of the first track of the first local primary source data unit with the second existing data of the second track of the local copy source data unit, read the first existing data of the first track of the first local primary source data unit for mirroring the first existing data to a corresponding track of the first remote secondary target data unit, so that the first existing data of the first track of the first local primary source data unit is overwritten with the second existing data of the second track of the local copy source data unit after the first existing data of the corresponding first track of the first local primary source data unit is read for mirroring the first existing data to a corresponding track of the first remote secondary target data unit.

8. The storage controller of claim 7 wherein the storage includes local file storage configured to store side files and wherein the local data copying logic is further configured to create a point-in-time snap copy of the local copy source data unit to the first local primary source data unit of the consistency group as a local copy target data unit of the local copy source data unit, and the asynchronous data mirroring logic is further configured to copy the first existing data read from the first track of the first local primary source data unit to a local primary side file for subsequent mirroring of the first existing data from the local primary side file to the corresponding track of the first remote secondary target data unit.

9. The storage controller of claim 8 wherein the local data copying logic is further configured to, in the initiating local to local copying from the local copy source data unit to the first local primary source data unit as a local copy target data unit of the local copy source data unit, to provide a local copy target data unit bitmap data structure associated with the first local primary source data unit as a local copy target data unit of the local copy source data unit wherein a set bit of the local copy target data unit bitmap data structure associated with the first track of the first local primary source data unit indicates that the first track of the first local primary source data unit retains the first existing data such that the second existing data of the second track of the local copy source data unit remains to be copied by the local to local copying to the first track of the first local primary source data unit and wherein a reset bit of the local copy target data unit bitmap data structure associated with the first track of the first local primary source data unit indicates that the first track of the first local primary source data unit contains the second existing data such that the second existing data of the second track of the local copy source data unit has been copied by the local to local copying to the first track of the first local primary source data unit.

10. The storage controller of claim 9 wherein the asynchronous data mirroring logic is further configured to mirror the first existing data to a corresponding track of the first remote secondary target data unit, said mirroring logic is further configured to determine a status of the bit of the local copy target data unit bitmap data structure associated with the first track of the first local primary source data unit, and if determined to be reset, mirror the first existing data from the local primary side file to the corresponding track of the first remote secondary target data unit and if determined to be set, mirror the first existing data from the first track of the first local primary source data unit.

11. The storage controller of claim 9 wherein the read/write logic is further configured to, in response to a host conducting a read operation directed to the first track of the first local primary source data unit, determine a status of the bit of the local copy target data unit bitmap data structure associated with the first track of the first local primary source data unit, and if determined to be reset, direct the host read operation to read the second existing data from the first track of the first local primary source data unit and if determined to be set, redirect the host read operation to read the second track of the local copy source data unit.

12. The storage controller of claim 7 wherein the local data copying logic is further configured to, prior to overwriting the first existing data of the corresponding first track of the first local primary source data unit with the second existing data of the second track of the local copy source data unit, wait for completion of the mirroring of the first existing data to a corresponding track of the first remote secondary target data unit, so that the overwriting the first existing data of the first track of the first local primary source data unit with the second existing data of the second track of the local copy source data unit occurs after the first existing data of the first track of the first local primary source data unit is read and mirrored to a corresponding track of the first remote secondary target data unit.

13. A computer program product for use with a host and a primary storage system at a first location, the primary storage system having a primary storage controller and a first storage unit controlled by the primary storage controller and configured to store a plurality of data units, and a secondary storage system at a second location remote from the first location, the secondary storage system having a secondary storage controller and a second storage unit controlled by the secondary storage controller and configured to store a plurality of data units, wherein the computer program product comprises a computer readable storage medium having program instructions embodied therewith, the program instructions executable by a processor a storage system to cause processor operations, the processor operations comprising:

initiating a consistency group using asynchronous local to remote mirroring of data from a first local primary source data unit to a first remote secondary target data unit wherein a first track of the first local primary source data unit stores first existing data in the first track;

after initiating the consistency group using asynchronous mirroring, initiating local to local copying from a local copy source data unit to the first local primary source data unit as a local copy target data unit of the local copy source data unit wherein a second track of the local copy source data unit stores second existing data in the second track, said local to local copying including overwriting tracks of the first local primary source data unit with existing data from corresponding tracks of the local copy source data unit;

updating the second existing data of the second track of the local copy source data unit with update data;

prior to overwriting the first existing data of the first track of the first local primary source data unit with the second existing data of the second track of the local copy source data unit, reading the first existing data of the first track of the first local primary source data unit for mirroring the first existing data to a corresponding track of the first remote secondary target data unit; and overwriting the first existing data of the first track of the first local primary source data unit with the second existing data of the second track of the local copy source data unit after reading the first existing data of the corresponding first track of the first local primary source data unit for mirroring the first existing data to a corresponding track of the first remote secondary target data unit.

14. The computer program product of claim 13 wherein the local to local copying includes creating a point-in-time snap copy of the local copy source data unit to the first local primary source data unit of the consistency group, as a local copy target data unit of the local copy source data unit, the operations further comprising local to local copying the first existing data read from the first track of the first local primary source data unit to a local primary side file for subsequent mirroring of the first existing data from the local primary side file to the corresponding track of the first remote secondary target data unit.

15. The computer program product of claim 14 wherein the initiating local to local copying from the local copy source data unit to the first local primary source data unit as a local copy target data unit of the local copy source data unit includes providing a local copy target data unit bitmap data structure associated with the first local primary source data unit as a local copy target data unit of the local copy source data unit wherein a set bit of the local copy target data unit bitmap data structure associated with the first track of the first local primary source data unit indicates that the first track of the first local primary source data unit retains the first existing data such that the second existing data of the second track of the local copy source data unit remains to be copied by the local to local copying to the first track of the first local primary source data unit and wherein a reset bit of the local copy target data unit bitmap data structure associated with the first track of the first local primary source data unit indicates that the first track of the first local primary source data unit contains the second existing data such that the second existing data of the second track of the local copy source data unit has been copied by the local to local copying to the first track of the first local primary source data unit.

16. The computer program product of claim 15 wherein the operations further comprise mirroring the first existing data to a corresponding track of the first remote secondary target data unit, said mirroring including determining a status of the bit of the local copy target data unit bitmap data structure associated with the first track of the first local primary source data unit, and if determined to be reset, mirroring the first existing data from the local primary side file to the corresponding track of the first remote secondary target data unit and if determined to be set, mirroring the first existing data from the first track of the first local primary source data unit.

17. The computer program product of claim 15 wherein the operations further comprise in response to a host conducting a read operation directed to the first track of the first local primary source data unit, determining a status of the bit of the local copy target data unit bitmap data structure associated with the first track of the first local primary source data unit, and if determined to be reset, direct the host read operation to read the second existing data from the first track of the first local primary source data unit and if determined to be set, redirect the host read operation to read the second track of the local copy source data unit.

18. The computer program product of claim 13 wherein the operations further comprise prior to overwriting the first existing data of the corresponding first track of the first local primary source data unit with the second existing data of the second track of the local copy source data unit, waiting to complete mirroring of the first existing data to a corresponding track of the first remote secondary target data unit, so that the overwriting the first existing data of the first track of the first local primary source data unit with the second existing data of the second track of the local copy source data unit occurs after the first existing data of the first track of the first local primary source data unit is read and mirrored to a corresponding track of the first remote secondary target data unit.

* * * * *